United States Patent [19]
Wrobbel et al.

[11] Patent Number: 6,090,338
[45] Date of Patent: Jul. 18, 2000

[54] METHOD AND DEVICES FOR COATING A CARRIER PART

[75] Inventors: Werner Wrobbel, Gütersloh; Jochen Vermehr, Rinteln, both of Germany

[73] Assignee: Moeller Plast GmbH, Bielefeld, Germany

[21] Appl. No.: 09/039,938

[22] Filed: Mar. 16, 1998

Related U.S. Application Data

[63] Continuation of application No. PCT/DE96/01559, Aug. 23, 1996.

[51] Int. Cl.[7] ................................................. B29C 49/04
[52] U.S. Cl. ................... 264/515; 264/514; 264/173.16; 264/177.16; 425/131.1; 425/133.1; 425/532
[58] Field of Search .............................. 425/133.1, 131.1, 425/132, 532; 264/514, 173.16, 177.16, 515

[56] References Cited

U.S. PATENT DOCUMENTS

| | | | |
|---|---|---|---|
| 3,257,482 | 6/1966 | Schechter | 264/45 |
| 4,297,092 | 10/1981 | Goron | 425/133.1 |
| 5,156,796 | 10/1992 | Nakagawa et al. | 264/514 |

*Primary Examiner*—Katherine A. Bareford
*Attorney, Agent, or Firm*—Herbert L. Lerner; Laurence A. Greenberg; Werner H. Stemer

[57] ABSTRACT

A method and devices for coating a carrier part make it possible to coat the carrier part formed of a less expensive material with a higher-quality and thus more-expensive material in only a defined region. As a result, novel properties attainable by the coating, such as improving hardness or resistance or varying color or appearance, finally exist only in the region where it is actually needed. Therefore, the coating material is fed in through one or more associated feeding devices, below a distributor head, in a preliminary tube that is already provided with the carrier material, in one or more angular regions relative to the horizontal axis of the preliminary tube. At least one distributor element that has adjustable segments is disposed below the rotatably disposed distributor head. The segments are provided with profiled sections for providing different wall thicknesses.

10 Claims, 4 Drawing Sheets

METHOD AND DEVICES FOR COATING A CARRIER PART

CROSS-REFERENCE TO RELATED APPLICATION

This application is a continuation of International Application Serial No. PCT/DE96/01559, filed Aug. 23, 1996, which designated the United States.

BACKGROUND OF THE INVENTION

Field of the Invention

The invention relates to a method for coating a carrier part with a material of a different consistency, using more than one feeding device. The invention also relates to devices for performing the method.

It is known to coat a carrier or support part all the way around and thus to adapt the carrier part to the intended use in terms of material. In that case the carrier part or substrate is formed of a less expensive material, and the encompassing coating is formed of a higher-quality and thus more-expensive material. In many cases, however, the novel property attainable by the coating, such as improving the hardness or resistance or changing the color or appearance, are needed in only a defined region of the carrier part. Accordingly, the higher-quality material is being applied in a region where it is not absolutely needed.

SUMMARY OF THE INVENTION

It is accordingly an object of the invention to provide a method and devices for coating a carrier part, which overcome the hereinafore-mentioned disadvantages of the heretofore-known methods and devices of this general type and which are less expensive, without impairing properties required for an intended use.

With the foregoing and other objects in view there is provided, in accordance with the invention, a method for coating a carrier part with a material of some other consistency, which comprises feeding a carrier material with one feeding device into a preliminary tube having a horizontal axis; and then feeding a coating material with at least one other feeding device below a distributor head into at least one angular region of the preliminary tube relative to the horizontal axis.

In accordance with another mode of the invention, the coating material is introduced at a variable angular region to the horizontal axis of the preliminary tube, and the various materials are introduced through the feeding devices at different speeds.

With the objects of the invention in view there is also provided a device for coating a carrier part with a material of some other consistency, comprising a distributor head; a distributor element disposed below the distributor head; a preliminary tube having a horizontal axis; one feeding device for feeding a carrier material into the preliminary tube; and at least one other feeding device disposed below the distributor head and associated with the distributor element for subsequently feeding a coating material into at least one angular region of the preliminary tube relative to the horizontal axis.

In accordance with another feature of the invention, the distributor element has a connection for the other feeding device.

In accordance with a further feature of the invention, the distributor element has adjustable segments, with which adjusting screws that may be accessible from the outside are expediently associated.

In accordance with an added feature of the invention, the distributor head is rotatably disposed.

In accordance with an additional feature of the invention, the segments have profiled sections, to provide different wall thicknesses.

With the objects of the invention in view there is additionally provided a device for coating a carrier part with a material of some other consistency, comprising a distributor head; an intermediate ring disposed below the distributor head; distributor elements disposed in the intermediate ring; a preliminary tube having a horizontal axis; one feeding device for feeding a carrier material into the preliminary tube; and at least one other feeding device disposed below the distributor head and associated with the intermediate ring for subsequently feeding a coating material into at least one angular region of the preliminary tube relative to the horizontal axis.

In accordance with another feature of the invention, the intermediate ring is interchangeably constructed.

In accordance with a concomitant feature of the invention, the distributor elements are provided with profiled sections to provide different wall thicknesses.

Other features which are considered as characteristic for the invention are set forth in the appended claims.

Although the invention is illustrated and described herein as embodied in a method and devices for coating a carrier part, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
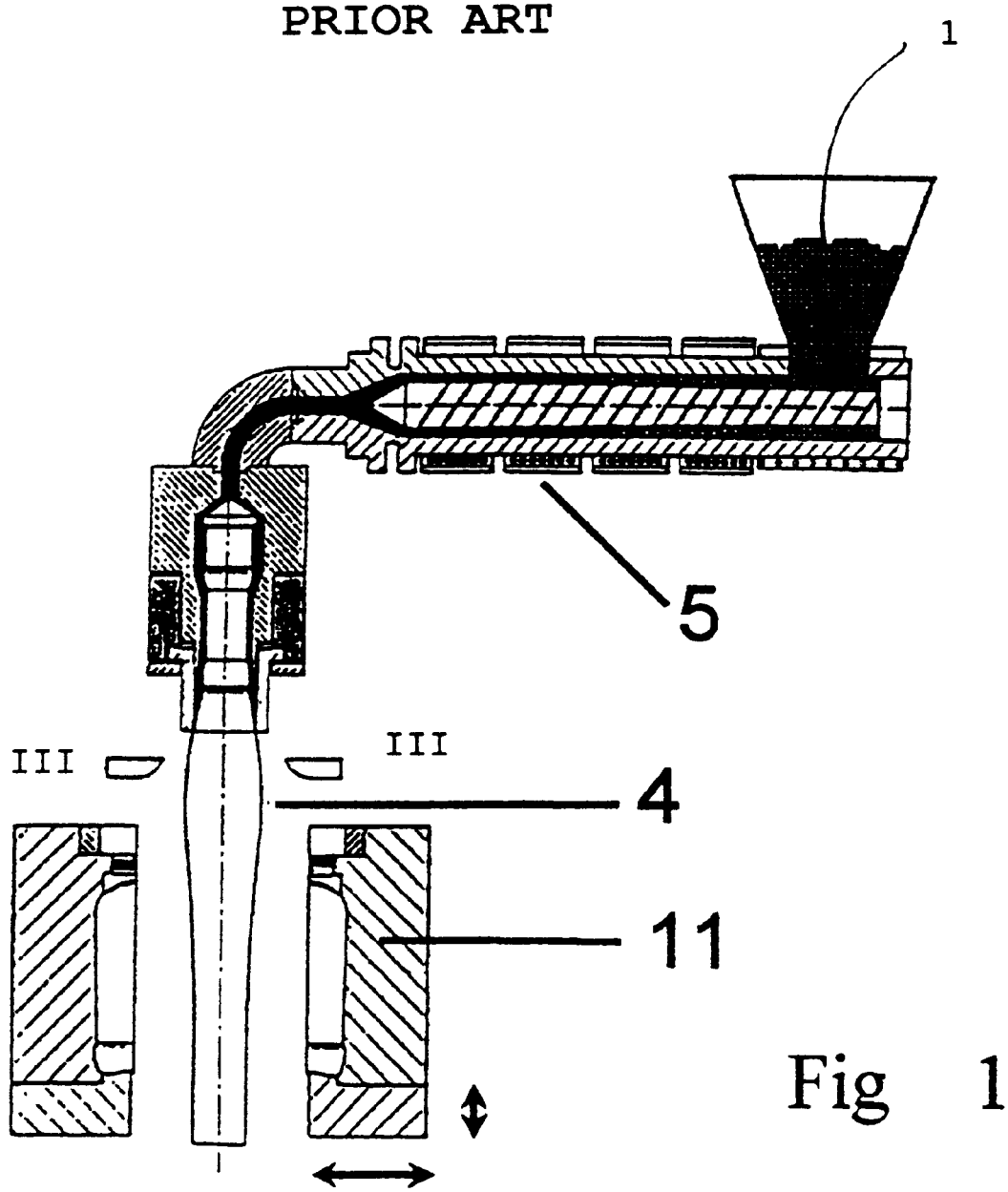
FIG. 1 is a diagrammatic, longitudinal-sectional view of a known extruder unit with a blow mold.
Figure 3:
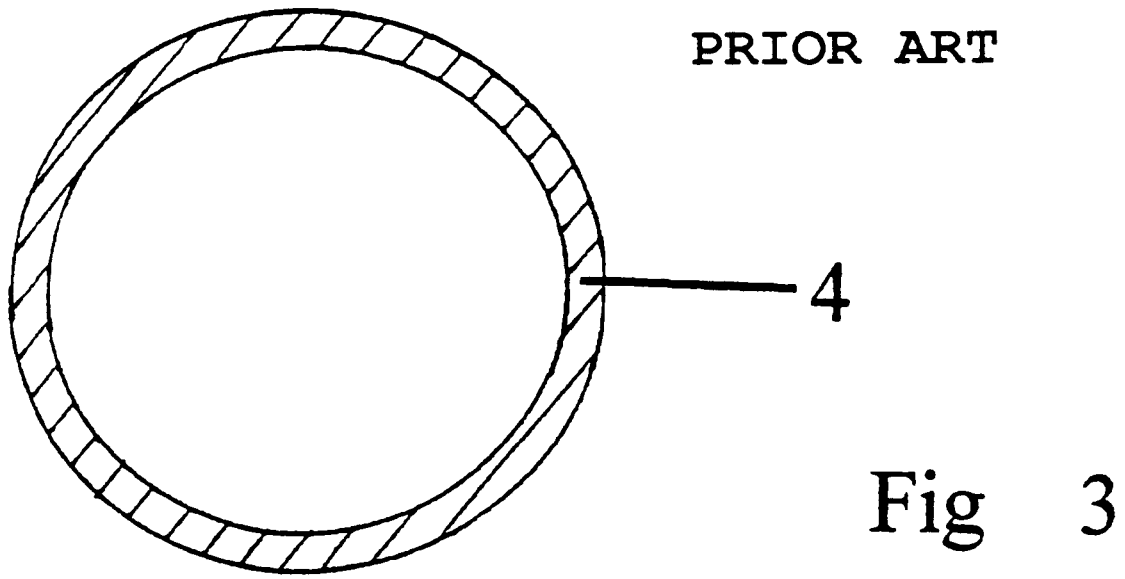
FIG. 3 is a cross-sectional view taken along a line III—III of FIG. 1.

Referring now to the figures of the drawings in detail and first, particularly, to FIGS. 1 and 3 thereof, there is seen a first extruder 5, from which a carrier material 1 is blown into a preliminary tube 4. The preliminary tube 4 is guided in a tool 11 that is to be opened.

Figure 2:
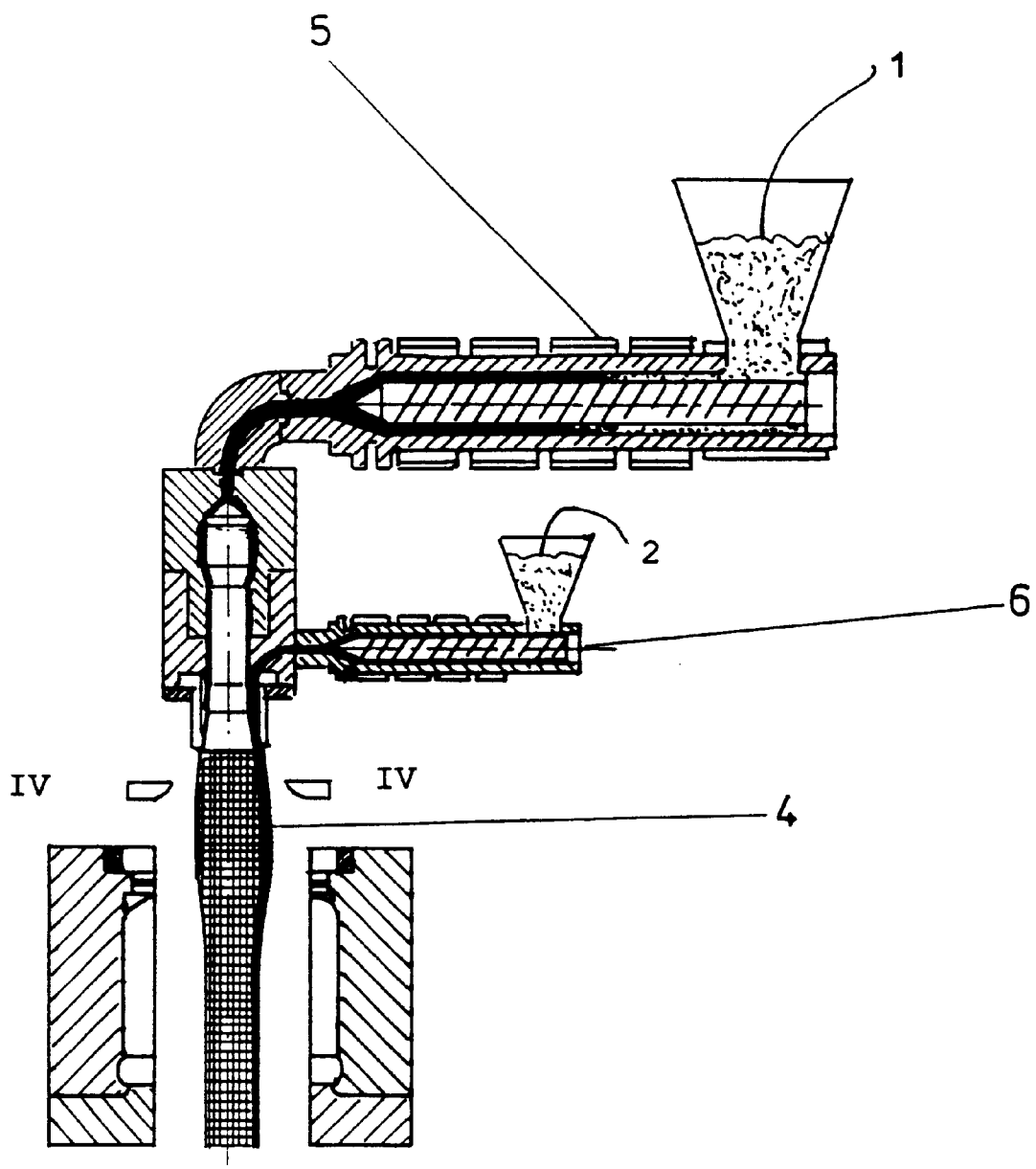
FIG. 2 is a longitudinal-section view, similar to FIG. 1, of an associated second extruder unit and a preliminary tube with a segmented coating.
Figure 4:
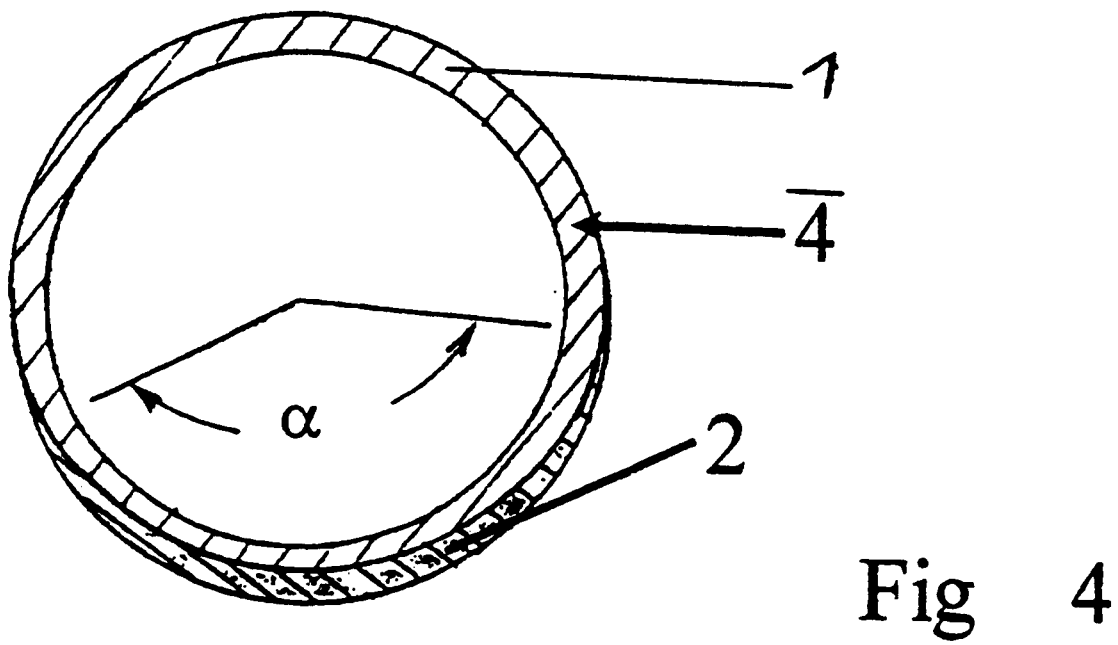
FIG. 4 is a cross-sectional view taken along a line IV—IV of FIG. 2.

FIGS. 2 and 4 show the first extruder 5 for the carrier material 1 as well as a second extruder 6 from which a coating material 2 is blown into the preliminary tube 4 at a predetermined angular region $\alpha = 145°$ relative to a horizontal axis of the preliminary tube 4. The two materials 1, 2 are introduced into the preliminary tube 4 at different feeding speeds. The coating material 2 is blown through a distributor element 7, as will be explained below with regard to FIG. 5.

Figure 5:
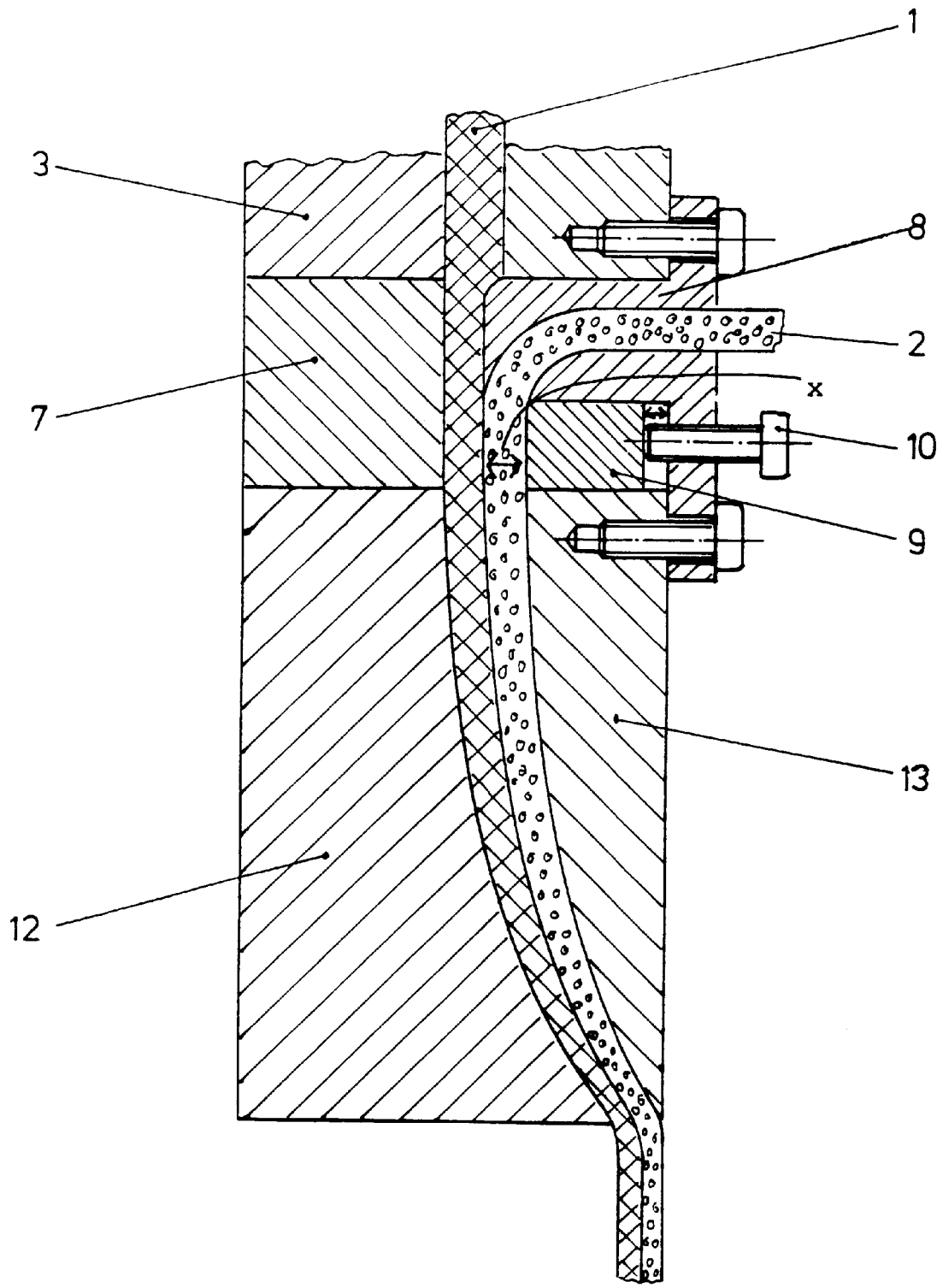
FIG. 5 is an enlarged, fragmentary, longitudinal-sectional view of a distributor element with adjoining tool parts.

FIG. 5 shows that the distributor element 7 is disposed below a distributor head 3, which is provided with a connection 8 for the second extruder 6. The distributor element 7 has adjustable segments 9 in order to vary the angular region α for the coating material 2. Adjusting screws 10 that are accessible from outside are used to adjust these segments 9. The segments 9 are displaceable horizontally by an amount X shown in FIG. 5. A core 12 and a nozzle 13 are disposed below the distributor element 7 and the segments 9.

We claim:

1. A method for coating a carrier part with a material of some other consistency, which comprises:

extruding a preliminary tube of a carrier material having a longitudinal axis to form a carrier part;

co-extruding a coating material with the preliminary tube onto a circumferential region on the outside of the preliminary tube using a distributor element through which the coating material is provided onto the preliminary tube and which contains adjustable distributor segments and wherein individual segments are radially adjustable with respect to the longitudinal axis of the preliminary tube;

adjustably setting the angular size of the circumferential region and the applied coating material thickness by adjustment of the distributor segments; and deforming the co-extruded preliminary tube and coating material by blow molding.

2. The method according to claim 1, wherein the co-extruding step is performed by co-extruding the coating material onto the preliminary tube in a plurality of different circumferential regions of the preliminary tube with a respective plurality of extruders.

3. The method according to claim 1, which comprises extruding the carrier and coating materials at different speeds.

4. A device for coating a carrier part with a material of some other consistency, comprising:

a first feeding device having a first distributor element for forming a preliminary tube having a longitudinal axis, thus forming the carrier part; and a second feeding device connected to said first feeding device and a having a second distributor element which includes individual segments radially adjustable with respect to the longitudinal axis of the preliminary tube, whereby said second feeding device is used for co-extruding a coating material onto the preliminary tube on a variably sized circumferential region of the preliminary tube, wherein a boundary of the variably sized circumferential region, including circumference and thickness of the region, is determined by an adjustment of said individual segments.

5. The device according to claim 4, wherein said first distributor element is rotatable.

6. The device according to claim 4, wherein said second feeding device is a plurality of second feeding devices.

7. The device according to claim 4, including at least one adjusting screw operatively associated with said individual segments.

8. The device according to claim 7, wherein the device has an exterior and said at least one adjusting screw is accessible from the exterior of the device.

9. The device according to claim 7, wherein said at least one adjusting screw is a plurality of adjusting screws each operatively associated with a respective one of said individual segments for radially adjusting said respective one of said individual segments.

10. The device according to claim 4, wherein said individual segments have profiled sections for providing a plurality of different coating material thicknesses over the variable circumferential region of the preliminary tube.

\* \* \* \* \*